United States Patent
Husain et al.

(10) Patent No.: US 9,537,949 B2
(45) Date of Patent: Jan. 3, 2017

(54) COMPUTER SYSTEM IMAGE CLUSTERING ARCHITECTURE AND USE

(71) Applicant: ClearCube Technology, Inc., Austin, TX (US)

(72) Inventors: Syed Mohammad Amir Husain, Round Rock, TX (US); Randy P. Printz, Kingsland, TX (US)

(73) Assignee: ClearCube Technology, Inc., Austin, TX (US)

( * ) Notice: Subject to any disclaimer, the term of this patent is extended or adjusted under 35 U.S.C. 154(b) by 239 days.

(21) Appl. No.: 14/035,088

(22) Filed: Sep. 24, 2013

(65) Prior Publication Data
US 2015/0089022 A1 Mar. 26, 2015

(51) Int. Cl.
*G06F 15/16* (2006.01)
*H04L 29/08* (2006.01)
*G06F 9/44* (2006.01)

(52) U.S. Cl.
CPC ......... *H04L 67/1095* (2013.01); *G06F 9/4416* (2013.01); *H04L 67/34* (2013.01); *H04L 67/08* (2013.01)

(58) Field of Classification Search
CPC .... H04L 67/14; H04L 41/022; H04L 67/1095; H04L 67/34; G06F 9/4416
USPC ........................ 709/227, 219; 345/656; 713/2
See application file for complete search history.

(56) References Cited

U.S. PATENT DOCUMENTS

| | | | | |
|---|---|---|---|---|
| 6,993,642 B2* | 1/2006 | Burkhardt | ............ | G06F 9/4416 713/1 |
| 7,475,282 B2* | 1/2009 | Tormasov et al. | ............ | 714/6.3 |
| 7,631,038 B2* | 12/2009 | Dickens | ............... | G06F 9/4416 709/203 |
| 7,653,901 B2* | 1/2010 | Tameshige et al. | ......... | 717/168 |
| 7,953,793 B2* | 5/2011 | Cain | ..................... | G06F 9/4416 709/203 |
| 8,001,221 B2* | 8/2011 | Tameshige | ............. | H04L 41/06 709/217 |
| 8,126,959 B2* | 2/2012 | Paul | ..................... | G06F 9/4416 709/203 |
| 8,266,263 B2* | 9/2012 | Cain | ..................... | G06F 9/4416 709/203 |

(Continued)

*Primary Examiner* — Joseph E Avellino
*Assistant Examiner* — Binod J Kunwar
(74) *Attorney, Agent, or Firm* — Meyertons Hood Kivlin Kowert & Goetzel. P.C.; Jeffrey C. Hood; Mark S. Williams (57) ABSTRACT

System and method for distributed computing. Each of multiple server computer systems may include one or more microservers, a network interface, and a network switch, coupled to the one or more microservers and the network interface, the network switch configured to switchably connect any of the microservers to a network via the network interface. Each microserver may be configurable to implement a respective server based on a computer image file, including a pre-execution environment (PXE) boot image. A management server computer may manage the server computer systems, including: providing or designating provision of computer image files to the server computer systems. Each server computer system may receive a computer image file from the management server computer or a designated computer image file store, implement a PXE boot image on a microserver accordingly, connect to one or more client computers over the network, and provide computer services to the client computers.

19 Claims, 4 Drawing Sheets

(56) References Cited

U.S. PATENT DOCUMENTS

| | | | |
|---|---|---|---|
| 8,381,264 B1* | 2/2013 | Corddry | H04L 67/22 726/3 |
| 8,468,226 B2* | 6/2013 | Nagai | G06F 8/63 709/208 |
| 8,762,701 B2* | 6/2014 | Weber et al. | 713/2 |
| 8,996,667 B2* | 3/2015 | Clerc | G06F 9/4416 709/222 |
| 9,081,747 B1* | 7/2015 | Tabieros | G06F 8/60 |
| 2002/0078188 A1* | 6/2002 | Anand | G06F 9/4416 709/222 |
| 2003/0126426 A1* | 7/2003 | Frye, Jr. | G06F 9/4416 713/2 |
| 2005/0216911 A1* | 9/2005 | Yen et al. | 717/176 |
| 2006/0242228 A1* | 10/2006 | Eggers | H04L 29/06 709/203 |
| 2006/0242400 A1* | 10/2006 | Anderson | G06F 9/4405 713/2 |
| 2007/0083748 A1* | 4/2007 | Erickson | G06F 9/4416 713/2 |
| 2007/0157016 A1* | 7/2007 | Dayan et al. | 713/2 |
| 2007/0198819 A1* | 8/2007 | Dickens et al. | 713/1 |
| 2008/0005611 A1* | 1/2008 | Solyanik | 714/6 |
| 2008/0046708 A1* | 2/2008 | Fitzgerald | G06F 8/63 713/2 |
| 2009/0037719 A1* | 2/2009 | Sakthikumar | G06F 9/4405 713/2 |
| 2010/0174810 A1* | 7/2010 | Cain et al. | 709/222 |
| 2011/0125990 A1* | 5/2011 | Khosravi et al. | 713/2 |
| 2011/0320800 A1* | 12/2011 | Azam | G06F 9/4416 713/2 |
| 2012/0110312 A1* | 5/2012 | Domsch et al. | 713/2 |
| 2013/0006953 A1* | 1/2013 | Epshtein et al. | 707/706 |
| 2013/0007435 A1* | 1/2013 | Bayani | 713/2 |
| 2013/0013910 A1* | 1/2013 | Temporelli | G06F 9/4416 713/2 |
| 2013/0290694 A1* | 10/2013 | Civilini | H04L 41/28 713/2 |
| 2014/0244822 A1* | 8/2014 | Ban | G06F 9/5044 709/223 |
| 2014/0365641 A1* | 12/2014 | Cho | G06F 13/4022 709/224 |
| 2015/0019850 A1* | 1/2015 | Rivera | 713/1 |
| 2015/0039875 A1* | 2/2015 | Di Cocco | G06F 9/4416 713/2 |

\* cited by examiner

COMPUTER SYSTEM IMAGE CLUSTERING ARCHITECTURE AND USE

FIELD OF THE INVENTION

The present invention relates generally to networked computing systems in which a plurality of human interfaces are coupled via a network to a plurality of computer systems, e.g., co-located or centralized computers, e.g., blade computers, and more specifically, to various embodiments of a system and method for implementing PXE boot images on microservers.

DESCRIPTION OF THE RELATED ART

Many commercial businesses and enterprises make extensive use of personal computers (PCs) in their daily operations. Typically, each user of a PC in the enterprise has a networked PC at his/her desk or work area. As the number of networked computer systems utilized in an enterprise increases, the management of resources in the network may become increasingly complex and expensive. Some of the manageability issues involved in maintaining a large number of networked computer systems may include ease of installation and deployment, the topology and physical logistics of the network, asset management, scalability (the cost and effort involved in increasing the number of units), troubleshooting network or unit problems, support costs, software tracking and management, as well as the simple issue of physical space, be it floor space or room on the desktop, as well as security issues regarding physical assets, information protection, software control, and computer virus issues.

Many of these issues may be addressed by centralizing the locations of the PCs, such as by installing multiple PCs into a central frame or cabinet, and locating each PC's human interface (e.g., keyboard, display device, mouse, etc.) at a respective remote location, e.g., more than 10 or 20 feet from the computing system. In one approach, each computer in the system may be a "computer on a card", also referred to as a computer blade or "blade". In other words, each computer may be comprised on a circuit card that may include standard computing system components such as a CPU, memory, power supply, and network interface, as well as an extender, e.g., a USB or PCI extender, for communicating with the remote human interface. A computing system in which a plurality of human interfaces are coupled via a network to a plurality of centralized computer blades is referred to herein as a blade computing system.

One type of networked computing system that is increasingly utilized is referred to as a "cloud system", in which multiple users access server-provided computer resources over a network, e.g., storage, processing tasks, applications, etc. Client systems coupled to the "cloud" may utilize provided resources without regard to which server (or even how many servers) provides the resources.

Some network based computing systems implement or utilize particular types of client/server architecture referred to as thin client or zero client. Thin and zero clients rely substantially or entirely upon the server for performing data processing tasks. The thin or zero client supports user interface functionality, e.g., presenting information to the user, e.g., via display, speakers, etc., receiving user input from the user via input devices, and providing user input to the server, etc., while the server performs most or all of the data processing. Note that thin clients may run a full operating system (OS), whereas zero clients generally do not, e.g., a zero client's OS may be a minimal or stripped down OS, such as a kernel that primarily initializes network communications/protocol and manages/displays I/O to and from the server(s) over the network. A cloud client may be considered a subtype of zero client.

Another current trend in computer network technologies is the use of virtual machines. Virtual machines (VMs) are software processes or environments that implement a "computer within a computer", where, for example, the VM may execute a different operating system or even instruction set from its host computer. A client (and its user) may interact with and perceive the VM as a physical machine, although it is actually a software process.

Virtualization has achieved significant popularity in enterprise systems, such as datacenters. What started as a way to organize and make server hardware more efficient, while adding management benefits on top, has now become a mass movement towards a new IT (information technology) architecture that considers containerization, simplicity of movement/migration and upgrades, and numerous other virtualization benefits as necessary features of an enterprise system, e.g., a datacenter. Moreover, in addition to enterprise systems such as datacenters, and server applications, virtualization has also become popular on the desktop, e.g., providing a desktop computer experience to users over a network via thin or zero clients. Thin client penetration is increasing in the realm of enterprise systems, and companies specializing in these devices are doing well. Because the backend component that these thin (or zero) clients connect to is increasingly often a virtual machine, rather than other traditional forms of server computing, it merely reinforces the reality that virtualization is a pervasive trend across multiple levels of the IT stack.

Primarily, virtualization provides the following benefits:

1) Hardware independence: The ability to move virtual machines to different physical platforms without worrying about the underlying hardware.

2) Containerization: Encapsulating all the elements—OS (operating system), data, configuration, preferences, customization elements, drivers, updates and more—into a single virtual machine (VM), which is, basically, a file.

3) Ease of backups: VMs can be backed up more simply, because, once again, they are files.

4) Disaster Recovery and Fault Tolerance: While traditional server techniques to implement fault tolerance, high availability and disaster recovery do certainly exist, e.g., clustering, for one, they are often more complex to implement than their virtualized analogues. A hypervisor and associated management tier will often provide these services in a way that offloads the complexity from the application or OS to a common HA/FT (high availability/fault tolerant) tier enabled by hypervisor infrastructure.

5) Data protection: Especially in the case where a virtual machine is being used as a container for a desktop operating system, and delivering a virtual desktop infrastructure (VDI) to an end user, the virtual machine removes the need to have a local hard drive at the end user's location. This means that the theft or loss of an endpoint device does not mean that important data has been compromised, i.e., for example, the data are always kept safe in the datacenter or enterprise.

6) Improved utilization of hardware: It is increasingly impossible for most existing applications to fully leverage the power of a highly multicore, modern processor without leaving the processor idle most of the time. Virtualization shares the processor across many operating system and application instances and thus gets improved utilization from the same hardware.

However, these benefits of virtualization come at a price. Some of the common issues or problems with virtualization include:

1) Software Complexity: The use of hypervisors introduces numerous additional pieces of infrastructure software to the mix, and this often leads to a non-trivial increase in complexity.

2) Cost: While for some applications (usually non parallelized, non-HPC (non-high performance computing), traditional enterprise server apps), the cost savings that materialize from consolidating hardware can be a boon, the cost of buying hypervisor (i.e., virtual machine monitor) and virtualization management infrastructure licenses is not insignificant. For example, VMware, Inc. currently prices their full featured license at $3,999 per server socket. This means that just the Hypervisor license for a dual-Xeon server now costs as much as the server itself! And more often than not, numerous pieces of the actual cost of virtualization are entirely ignored in the initial calculations. For example, will the existing backup software work well or will the customer need to purchase new licenses for hypervisor integrated backup software? Will the customer manually perform migrations or purchase a physical to virtual conversion tool? Will physical infrastructure need to be upgraded at the network and storage tiers? Will the workforce have to be re-trained to use new management consoles, new storage technologies, etc.?

3) Security challenges: The hypervisor delivers all of its benefits by inserting a layer of indirection between the OS and the underlying hardware. It strives to make itself invisible to the OS and application stack, and in doing so, creates security challenges. For one, due to consolidation, if a hypervisor is compromised, all the associated applications and the operating system on top are compromised as well. These compromises are multi-faceted and can include issues such as device hijacking, where I/O to an underlying device is captured, compromised, modified, or otherwise manipulated, as well as video buffer grabs, where, entirely unbeknownst to the OS or applications running within VMs, the entire screen, everything typed or viewed therein, and all the data it exposes, can be captured and siphoned off to a file or remote destination. If this same attack vector were used with a non-virtualized operating system, the code responsible for this desktop/video capture would be somewhere in memory, managed by the OS and would show up as a process. However, when similar code runs at the hypervisor level, it executes in a scope completely unmanaged by the OS. Thus, anti-virus or anti-malware software running within the VM will do nothing to prevent such compromises. Hyper-jacking, as it is called, is a very real and serious threat.

4) Physical infrastructure complexity: Consolidation and leverage of higher end virtualization features, such as virtual machine live migration or fault tolerance, impose significant demands on centralized physical infrastructure. For example, if an IT department has two hypervisor hosts, each running 10 or 20 critical enterprise applications, they will more than likely opt for a redundant network switch configuration so as to prevent 40 critical applications from going down with a single switch failure. Similarly, in order to even enable fault tolerance, they will likely invest in dedicated high speed NICs. More than likely, their centralized storage needs—especially in terms of performance—will rocket. These are all very real issues that companies that have adopted virtualization grapple with regularly.

5) Performance challenges: This is a complex topic, but it is safe to say, hypervisors—however efficient—represent an additional layer of indirection between the operating system and the hardware. More code typically means more CPU cycles to run that code, which equates to at least some performance penalty. This is particularly pronounced in applications that make heavy use of GPUs (graphics processing units) or other physical devices, or those that require fast, direct I/O access. Many of the techniques recommended by IT architects to alleviate performance challenges with virtualized infrastructure may actually either increase cost, or undermine the promised benefits of virtualization, or both. For example, a common complaint regarding virtualized environments is storage performance. In order to use features such as high availability and fault tolerance, centralized storage is needed. Since this storage is hosting virtual disks for many servers, its IOPS (input/output operations per second) performance needs to be quite high. In other words, this is not inexpensive, run of the mill storage used to store user profiles. All these data are being read from and written to storage elements, e.g., magnetic platters, housed in a storage appliance, and are piped through the storage appliance's I/O controller via DMA and/or the CPU/memory on the storage device, pumped in to the network card (NIC), pushed across a wire, routed into the switch, and then fed into the hypervisor's network card, all the way up until it is served to the application requesting it. In order to resolve storage performance challenges, many providers of solid state drive (SSD) based storage appliances have arisen. SSDs certainly reduce the latency penalty imposed by a spinning mechanical drive, but come at a huge cost. Even today, SSDs are 10-25× the cost of magnetic storage, and it doesn't end there. To deliver all the data between systems, a fast network is required. Thus, the customer may need to decide whether to implement 10 Gbps Ethernet, new switches with numerous 10 Gbps ports, Infiniband, and so forth.

If the customer doesn't want to spend significant money procuring centralized storage systems that are fast enough to keep up with all the VMs making use of them, a more pragmatic approach may be used. For example, the customer may opt for using localized VM storage on disks contained within a server. This approach can certainly ameliorate the problem of shuttling data back and forth across the network, and, with fewer VMs making requests to local disks, the burden on the drives themselves is lowered (or distributed) somewhat. However, in most virtualization scenarios, this cost-saving tactic results in the loss of substantial virtualization benefits, such as fault tolerance and high availability.

The Google/Hadoop Model—HPC Style Computing with Simple Hardware

Despite all the challenges, virtualization makes sense for many applications; however, it might not make sense for all applications. Massively large datacenters run by companies like Google, Inc., do not make use of this technology, but rather, use HPC techniques, distributed file systems, and applications architected to make use of software infrastructure (Map-Reduce, Hadoop) that is inherently tolerant of failures. In this approach, the server is not a "premium" asset that must be constantly monitored, cared for and showered with attention, i.e., it is not an expensive piece of hardware with the best quality components money can buy. Rather, in these systems, each server is simply a "node" in an array of many, many others like it. If it perishes, it perishes. The applications running on top simply adjust and divert their workload to servers that are around. At their convenience, the IT group simply dispatches a replacement for an expired server, which is quickly removed and replaced with no additional configuration necessary.

In the Google datacenter model, many of the benefits of virtualization are provided, but they require the applications running on this infrastructure to be architected in a way that is suited to the underlying hardware environment. Thus, this approach is not particularly suited for standard enterprise solutions, such as J.D. Edwards applications.

Thus, improved virtualization systems are desired.

SUMMARY

Various embodiments of a system and method for implementing and managing a distributed computing system are disclosed. A plurality of server computer systems in a distributed system may be provided. Each server computer system may include one or more microservers, where each microserver may be configurable to implement a respective server based on a computer image file. As described in more detail below, in some embodiments, the computer image file may include a pre-execution environment (PXE) boot image. The server computer system may further include a network interface for connecting to a network, and a network switch, coupled to the one or more microservers and the network interface, where the network switch is configured to switchably connect any of the microservers to the network via the network interface.

The plurality of server computer systems may be managed, e.g., by a management server. In one embodiment, managing the plurality of server computer systems may include the following:

The distributed system may be discovered. For example, the management server may automatically determine the components of the distributed system. This discovering may include discovering one or more of: the plurality of server computer systems, the microservers comprised on the plurality of server computers, switching capabilities of the plurality of server computer systems, available storage devices of the plurality of server computer systems, and/or configuration of the available storage devices. In further embodiments, any other aspects of the distributed system may be discovered. Respective computer image files may be provided or designated for provision to the plurality of server computer systems for implementing respective boot images, e.g., PXE boot images, on respective microservers on the plurality of server computer systems. After the respective boot images are implemented on the respective microservers, the plurality of server computer systems may be configured to connect to one or more client computers over the network, and provide computer services to the one or more client computers over the network using a remote desktop protocol, e.g., for charge.

As described above, the system may include a plurality of server computer systems, where each server computer system of the plurality of server computer systems includes one or more microservers, where each microserver includes at least one processor, and a memory, coupled to the at least one processor, and where each microserver is configurable to implement a respective server based on a computer image file, e.g., including a pre-execution environment (PXE) boot image. As noted above, the system may further include a network interface for connecting to a network, and a network switch, coupled to the one or more microservers and the network interface, where the network switch is configured to switchably connect any of the microservers to the network via the network interface.

In some embodiments, the system may further include a management server computer, coupled to (over the network), or comprised in, the plurality of server computer systems, where the management server computer includes at least one processor, and a memory, coupled to the at least one processor. The memory may store program instructions executable by the at least one processor to manage the plurality of server computer systems.

Elaborating on or augmenting the above, in some embodiments, respective computer image files may be provided or designated for provision to the plurality of server computer systems for implementing respective PXE boot images on respective microservers. Each server computer system of the plurality of server computer systems may be configured to receive at least one computer image file from the management server computer or a designated computer image file store, and implement at least one PXE boot image on at least one of the one or more microservers based on the at least one computer image file. Each server computer system of the plurality of server computer systems may be further configured to connect to one or more client computers over the network, and provide computer services to the one or more client computers over the network using a remote desktop protocol.

In some embodiments, the computer image file may include one or more of: an operating system (OS) for the PXE boot image, configuration information for the PXE boot image, user preferences for the PXE boot image, drivers for the PXE boot image, or one or more updates for the PXE boot image. In further embodiments, the computer image file may include any other data or bootable elements or images desired.

In one embodiment, the memory of each microserver may be or include a solid-state drive (SSD), e.g., flash memory, random access memory (RAM), etc.

In some embodiments, each server computer system may be or include a blade server (i.e., a server implemented on a blade computer). Moreover, in some embodiments, the management server computer may itself be a microserver included in one of the server computer systems, where the management server computer may be connected to the other microservers via the network switch. The management server computer may further include a storage device, coupled to the at least one processor and the memory, where the management server computer may be configured to utilize the storage device for log data or management data, as desired.

Similarly, in one embodiment, two or more server computer systems of the plurality of server computer systems may each include a respective microserver that implements a respective management server computer. Each of the management server computers may be connected to the other microservers via the network switch of the server computer system, and may include a storage device, coupled to the at least one processor and the memory, where the respective management server computer is configured to utilize the storage device for log data or management data.

Alternatively, or additionally, in some embodiments, the (or a) management server computer may be separate and distinct from the plurality of server computer systems, and the management server computer may further include a network interface for connecting to the network, a network switch, coupled to the network interface, and configured to switchably connect the management server computer to any of the microservers over the network via the network interface, and a storage device, coupled to the at least one processor and the memory, where, as above, the management server computer may be configured to utilize the storage device for log data or management data.

In one embodiment, designating provision of respective computer image files may include the management server computer providing respective addresses of servers that contain the respective computer image files to one or more server computer systems of the plurality of server computer systems. Accordingly, to receive at least one computer image file from the management server or a designated computer image file store, the one or more server computer systems of the plurality of server computer systems may be configured to request and receive the respective computer image files from the servers that contain the respective computer image files based on the provided addresses.

In some embodiments, one of the microservers included in at least one of the server computer systems may be a cache microserver that includes a cache for computer image files for other microservers included in the server computer system. The cache microserver may include a storage device coupled to the at least one processor and the memory, where the cache is implemented via the storage device. The management server computer may be further configured to deliver computer image files for any of the other microservers included in the server computer system to the cache microserver, and each of the other microservers included in the server computer system may be configured to access the cache microserver to obtain respective computer image files.

In various embodiments, the cache microserver may be controllable by the management server computer to purge the cache, purge an individual computer image file from the cache, restart the cache microserver, take the cache microserver offline, and/or view logs on the cache server, among other cache related tasks.

Moreover, in some embodiments, at least one PXE boot image may implement a hypervisor and associated boot environment whereby a microserver is bootable into the hypervisor. Thus, the PXE boot image may provide both a virtual machine (VM) and a hypervisor (and associated boot environment) into which the microserver may be booted.

BRIEF DESCRIPTION OF THE DRAWINGS

A better understanding of the present invention can be obtained when the following detailed description of the embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF EMBODIMENTS

Incorporation by Reference:

The following references are hereby incorporated by reference in their entirety as though fully and completely set forth herein:

U.S. Pat. No. 6,119,146 titled "Computer Network Having Multiple Remotely Located Human Interfaces Sharing A Common Computing System", which was filed May 4, 1998, whose inventors are Barry Thornton, Andrew Heller, Daniel Barrett, and Charles Ely.

U.S. Pat. No. 6,038,616 titled "Computer System With Remotely Located Interface Where Signals Are Encoded At The Computer System, Transferred Through A 4-Wire Cable, And Decoded At The Interface", which was filed May 4, 1998, whose inventors are Barry Thornton, Andrew Heller, Daniel Barrett, and Charles Ely.

U.S. Pat. No. 6,012,101 titled "Computer Network Having Commonly Located Computing Systems", which was filed May 4, 1998, whose inventors are Andrew Heller, Barry Thornton, Daniel Barrett, and Charles Ely.

U.S. patent application Ser. No. 10/032,325 titled "System And Method For Remote Monitoring And Operation Of Personal Computers", which was filed Dec. 31, 2001, whose inventors are Ronald J. Perholtz and Eric J. Elmquest.

U.S. patent application Ser. No. 09/728,667 titled "Computer on a Card with a Remote Human Interface", filed Dec. 1, 2000, whose inventors are Andrew Heller and Barry Thornton.

U.S. patent application Ser. No. 09/728,669 titled "A System of Co-Located Computers in a Framework Including Removable Function Modules for Adding Modular Functionality", filed Dec. 1, 2000, whose inventor is Barry Thornton.

U.S. application Ser. No. 12/032,429, titled "Maintaining a Pool of Free Virtual Machines on a Server Computer", filed Feb. 15, 2008, which issued as U.S. Pat. No. 8,176,486.

U.S. application Ser. No. 12/032,446, titled "Associating Virtual Machines on a Server Computer with Particular Users on an Exclusive Basis", filed Feb. 15, 2008.

U.S. application Ser. No. 13/724,665, titled "Capturing and Restoring Session State of a Machine Without Using Memory Images", filed Dec. 21, 2012.

U.S. application Ser. No. 13/220,576, titled "Migrating Session State of a Machine Without Using Memory Images, filed Aug. 29, 2011.

U.S. application Ser. No. 13/490,971, titled "Zero Client Device With Integrated Serial Bandwidth Augmentation and Support for Out-Of-Band Serial Communications", filed Jun. 7, 2012.

U.S. application Ser. No. 12/876,012, titled "Mass Storage Lockout For USB Devices On Extended USB System", filed Sep. 3, 2010.

U.S. application Ser. No. 11/534,545, titled "Utility Computing System Having Co-located Computer Systems for Provision of Computing Resources", filed Sep. 22, 2006.

Terms

As used herein, the term "zero client" refers to an endpoint device which does not have a conventional operating system, has no removable storage, and has no independent operational capability other than acting as a decoder or receiver for a computing experience that executes on a remote server, workstation, or blade computer, and is transmitted over a network to the zero client. The protocols employed to transmit and decode this experience may include PCoIP, HDX, RemoteFX, or others, as desired. The terms "processing unit" and "functional unit" refer to any type of computational element, such as a processor (embedded or otherwise), application specific integrated circuit (ASIC), or Field Programmable Gate Array (FPGA), among others. As noted above, a cloud client is considered to be a subtype of zero client, and may support or implement a cloud specific protocol to communicate with a cloud over a network.

The term "Pre-boot eXecution Environment" (PXE) is one of the components of Intel's WfM specification. In the context of the present application, PXE refers to Intel's WfM specification as well as other equivalent or similar network boot methodologies. PXE allows a computer system to boot from a server on a network prior to booting the operating system on the local hard drive. A PXE-enabled computer system typically connects its network interface controller (NIC) to a local area network (LAN) via a jumper, which keeps the computer system connected to the network even when the power is off. Because a network administrator does not have to physically visit the specific computer system and manually boot it, operating systems and other software, such as diagnostic programs, can be loaded onto the device from a server over the network.

Below are presented descriptions of innovative systems and techniques that provide benefits not available in the prior art. It should be noted that in various different embodiments, any of the various features and functionalities described below may be used or omitted. In other words, any and all different combinations and subsets of the features and functionalities disclosed herein are contemplated and considered to be within the scope of this document.

Overview

Embodiments of a distributed computer system architecture and use are presented herein. More specifically, embodiments of a system and method for managing and using PXE boot images implemented on microservers in a distributed computer system are disclosed. Each PXE image may encapsulate or encode an operating system (OS) or a boot image. In various embodiments, the boot image may contain any bootable item, including a regular machine image and/or a hypervisor, among others. Each PXE boot image may thus implement a virtual machine (VM) accessible by remote users via remote human interfaces (e.g., monitor, keyboard, mouse, etc.). In some embodiments, the remote human interface may be implemented as or by a zero (or thin) client system, such as disclosed in U.S. application Ser. No. 13/490,971, titled "Zero Client Device With Integrated Serial Bandwidth Augmentation and Support for Out-Of-Band Serial Communications", which was incorporated by reference above.

Figure 1:
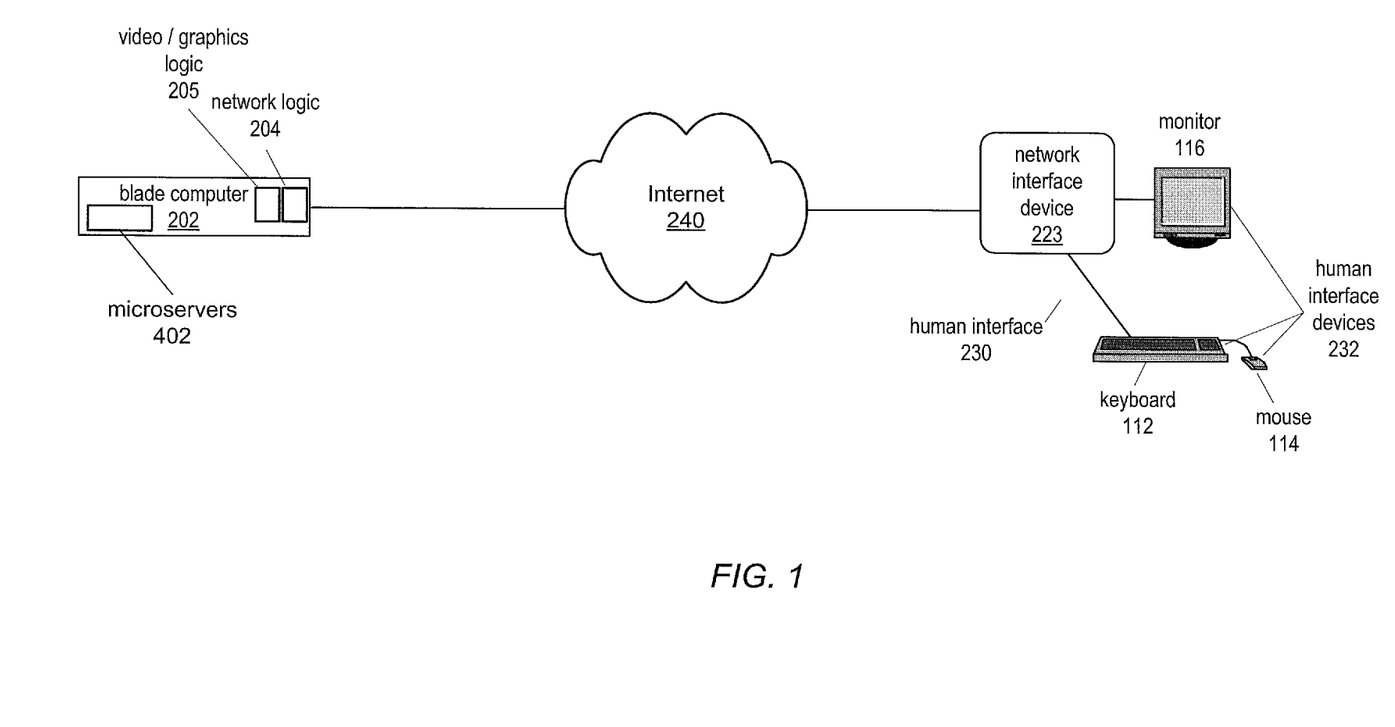
FIG. 1 illustrates an exemplary embodiment of a networked computer system with a remote human interface.

FIG. 1—Exemplary Distributed Computer System

FIG. 1 illustrates an exemplary network-based embodiment, where a blade computer 202 (with video/graphics logic 205 and network logic 204), which may be referred to as a host or server computer, couples to a remote human interface 230 via a network 240, such as the Internet. As FIG. 1 indicates, the human interface may include a network interface device 223, which may mediate or facilitate communications between the host computer 202 and the remote human interface 230. In the embodiment shown in FIG. 1, the specific configuration of the blade computer 202 may impose constraints on the performance of the system. Thus, as shown in FIG. 1, the human interface 230 [Fig. 1, element 230] may only include one monitor 116, and accordingly, the interface device 223 may only include video circuitry or logic supporting one display, although in other embodiments, one or more additional monitors and/or other human interface devices may be included in the human interface 230.

Similarly, the blade computer 202 may not include any special cards, e.g., proprietary network logic, etc., but instead may rely primarily on software for managing and implementing the packetized data transmission. However, in other embodiments, a single blade computer or server may be communicatively coupled over the network 240 to a plurality of remote human interfaces. As described below in detail, the host computer/server may include a plurality of microservers 402 implementing a respective plurality of servers based on corresponding computer image files, where each computer image file includes a pre-execution environment (PXE) boot image.

It should be noted that the host computer 202 shown in FIG. 1 is exemplary only, and that other form factors and implementations are contemplated, e.g., in some embodiments, the host computer may not be implemented as a blade computer, but may be any of various types of computer system, e.g., workstation, "headless" server (i.e., no local user interface), a stackable hexagonal (or rectangular or square or round, etc.) tube with components situated on the inside surface(s) of the tube, and so forth, as desired.

Note that in some embodiments, various portions of the functionality described above may be performed in hardware, software, or combinations of the two. For example, in one embodiment, video/graphics data generated by the video/graphics logic in the computing system may be packetized and otherwise processed by software, e.g., instead of this functionality being performed by the network logic.

Further details regarding embodiments of the blade computer(s) and interface device(s) are provided below.

The embodiment shown in FIG. 1 is single blade/single user interface system. In many embodiments, the system may include multiple co-located blade computing systems serving multiple human interfaces. For example, a plurality of blades (such as blade computer 202) may be installed in respective slots in a "cage", e.g., a rack mounted chassis or cabinet, as described below with reference to FIG. 2. The plurality of blades 202 may be configured to operate with a plurality of human interface systems 230. The human interface systems 230 may be distributed in user office locations in a single building or may be widely dispersed in a geographic region, such as a city, country, or the entire world. Moreover, as noted above each server (e.g., blade computer) may include multiple microservers, each of which may communicate with a respective remote human interface, and may provide computer services to a user thereof over a network.

In one embodiment, a first plurality of computers 202 supports a second greater plurality of human interface systems 230. Thus, for example, one blade 202 may support two or more human interface systems and hence two or more users. One blade 202 may support two or more human interface systems and hence two or more users concurrently and/or in a time sliced manner.

In one common configuration, a company may have a room where a plurality of co-located blade computing systems 202 are located in a rack, and these blade computers 202 may connect over a LAN to various human interface co-located blade computing systems 202 systems located in various offices or cubicles. In one embodiment a first number X of co-located computing systems 202 provide computing capability to a second number Y of human interface systems, or a second number Y of users, where Y is greater than X, e.g., Y is 2X, 3X, 4X, etc. In this embodiment, one computer 202 may be assigned to each of two or more users. More generally, each microserver in each (e.g., blade) computer may be assigned to a respective user or human interface.

Figure 2:
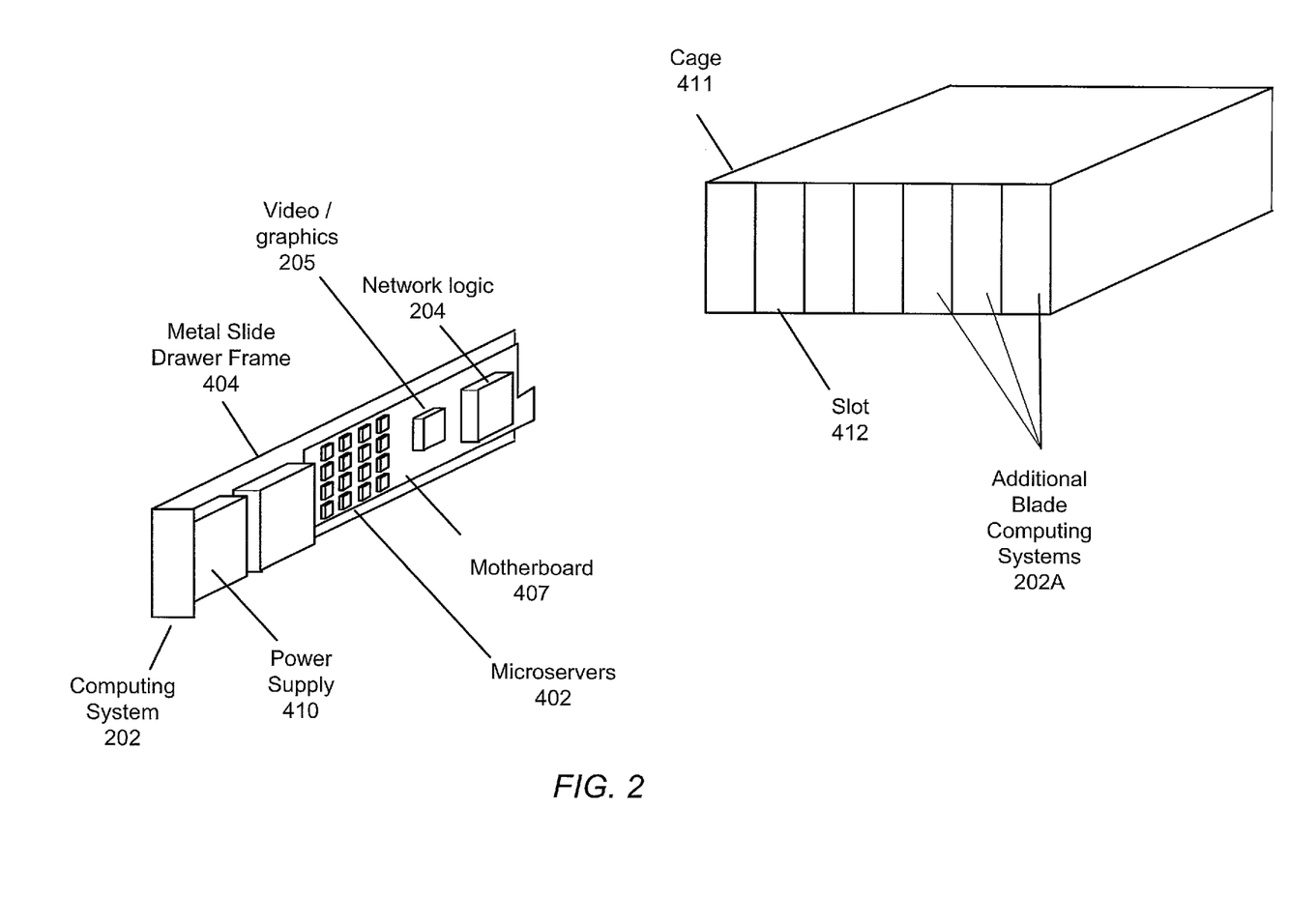
FIG. 2 illustrates a system with multiple co-located computing systems, according to one embodiment.

FIG. 2—Exemplary Blade Computer and Cage

FIG. 2 illustrates one embodiment of a blade computing system 202 suitable for implementing various embodiments of the invention, as well as an exemplary chassis or cage 411, operable to receive a plurality of such blades into respective slots 412, and to facilitate connection of the plurality of blades to a plurality of human interfaces 230 over the network. Each of the embodiments described above in FIGS. 1 and 2 may operate as a system of co-located computer systems communicating with a plurality of remote human interface systems, where the plurality of remote human interface systems may be distributed in various offices or homes in one or more geographic locations.

As FIG. 2 shows, in some embodiments, the computing system 202 may include a motherboard 407 with a plurality of microservers, and may further include video/graphics logic 205, and networking logic 204, as well as a power supply 410, and possibly a hard drive or other storage device 408. Additionally, the computing system 202 may include a plurality of microservers 402, described below. Thus, the computing system 202 may comprise a "computer on a card", also referred to as a "computer card" or "blade", that includes multiple microservers. In addition to network logic 204, the computing system 202 may further include software, e.g., extender software 420 that may facilitate communications with a human interface located remotely from the computing system 202. Note that the components and their arrangements are intended to be representational only, and are not intended to illustrate actual component design and layout.

In one embodiment the computing system 202 may include a cabinet, referred to as a cage 411, having a plurality of slots 412. The computer blade (or card) may be adapted to be inserted into one of the slots of the cage. For example, the computer blade 202 may be operable to slide into a slot 412 of the cage 411, thereby making contact with a cage connector which may couple to the network 240 (see FIG. 1). Thus, the computer blade or card 202 may comprise a complete PC on a single slide drawer frame which in some embodiments may be only 3 rack units high (5.25 inches), and thus may occupy a much smaller space than standard PC units. The cage 411 may be operable to receive a plurality of such computer cards via the plurality of slots 412, thus providing a means for co-locating a plurality of computing systems, each accessible by remote human interfaces.

The cage may include a backplane or communication medium connecting each of the cage connectors, thereby enabling networking of the computer cards, such as an Ethernet network. Thus the cage connector may provide for network connectivity between the computing systems 202 as well as external WAN connectivity, e.g., Internet connectivity. Further details of some embodiments of the computer card may be found in U.S. patent application Ser. No. 09/728,667 titled "Computer on a Card with a Remote Human Interface", and U.S. patent application Ser. No. 09/728,669 titled "A System of Co-Located Computers in a Framework Including Removable Function Modules for Adding Modular Functionality" which are both incorporated by reference above.

Note that the cage illustrated in FIG. 2 is meant to be exemplary only. In various embodiments, the cage may include more or less slots than shown, and/or may include multiple shelves with additional slots. In another embodiment, multiple cages such as that shown in FIG. 2 may be stacked or otherwise assembled and interconnected to form a composite, and optionally expandable, cage. As noted above, in some embodiments, each cage may be rack mountable, such that a plurality of such cages may be installed in a rack mount structure.

Figure 3:
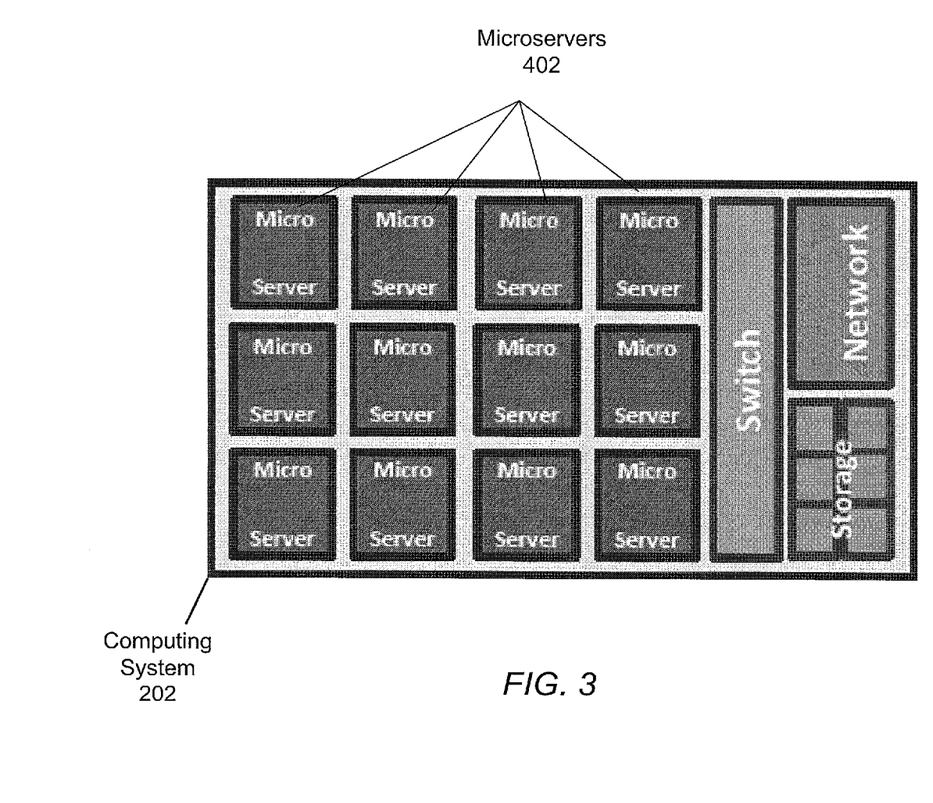
FIG. 3 illustrates an exemplary computer system that includes a plurality of microservers, according to one embodiment.

FIG. 3—Server Computer System with Microservers

FIG. 3 illustrates an exemplary computing system 202 with a plurality of microservers 402, according to one embodiment. In some embodiments, the computing system may be or comprise a blade computer, as described above. The computing system 202 may be or implement a server computer that includes one or more microservers, although generally, the server computer includes a plurality of microservers, as shown in FIG. 3. As mentioned above, in various embodiments, the server computer may have any of a variety of form factors and architectures, as desired.

Each microserver may include at least one processor, and a memory, coupled to the at least one processor. Each microserver may be configurable to implement a respective server based on a computer image file. In one embodiment, the computer image file may include a pre-execution environment (PXE) boot image, which, as noted above, may encapsulate or encode an operating system (OS) or a boot image. In various embodiments, the boot image may contain any bootable item, including a regular machine image and/or a hypervisor, among others. Each PXE boot image may thus implement a virtual machine (VM) accessible by remote users via remote human interfaces (e.g., monitor, keyboard, mouse, etc.).

The computing system (e.g., the blade computer), may further include a network interface, labeled "network" in FIG. 3, for connecting to a network, such as a wide area network, e.g., the Internet, and a network switch, which may be referred to herein as a "switch" for convenience, coupled to the one or more microservers and the network interface. The network switch may be configured to switchably connect any of the microservers to the network via the network interface.

The server computer may be configured to receive at least one computer image file from a management server computer or designated computer image file store, and implement at least one PXE boot image on at least one of the one or more microservers based on the at least one computer image file. The server computer may be further configured to connect to one or more client computers over the network, and provide computer services to the one or more client computers over the network using a remote desktop protocol. Thus, the computing system may be configured with multiple microservers, each of which may be used to provide computer services to client computers over the network, e.g., for charge.

As FIG. 3 also shows, in some embodiments, the computer system (e.g., server computer) may further include a storage device, labeled "storage" in FIG. 3, which may be configured to store data for managing the microservers and provision of computer services thereby, e.g., log data or management data. For example, in one embodiment, the storage device may store log data regarding what, when, and to whom, computer services are provided. In some embodiments, the storage device may store management data regarding client contracts, agreements, or subscriptions, which may be used to determine service access rights, schedules, fees, and so forth. Moreover, in some embodiments, the storage device may store performance data for the computing system. For example, one of the microservers may be configured to monitor the performance of the computing system, e.g., the "health" of the system and its components, and to store or log indicators thereof. If a deterioration or failure of a component is detected, the (monitoring) microserver may take responsive action, e.g., removing the component from operation, sending an alert to an authority or manager (e.g., an information technology (IT) professional), or any other action, as desired.

Referencing FIGS. 1, 2, and 3, in some embodiments, a plurality of such computing systems, e.g., server computers, may be provided and used in conjunction to provide computer services over a network, as described in detail with reference to the method of FIG. 4.

Figure 4:
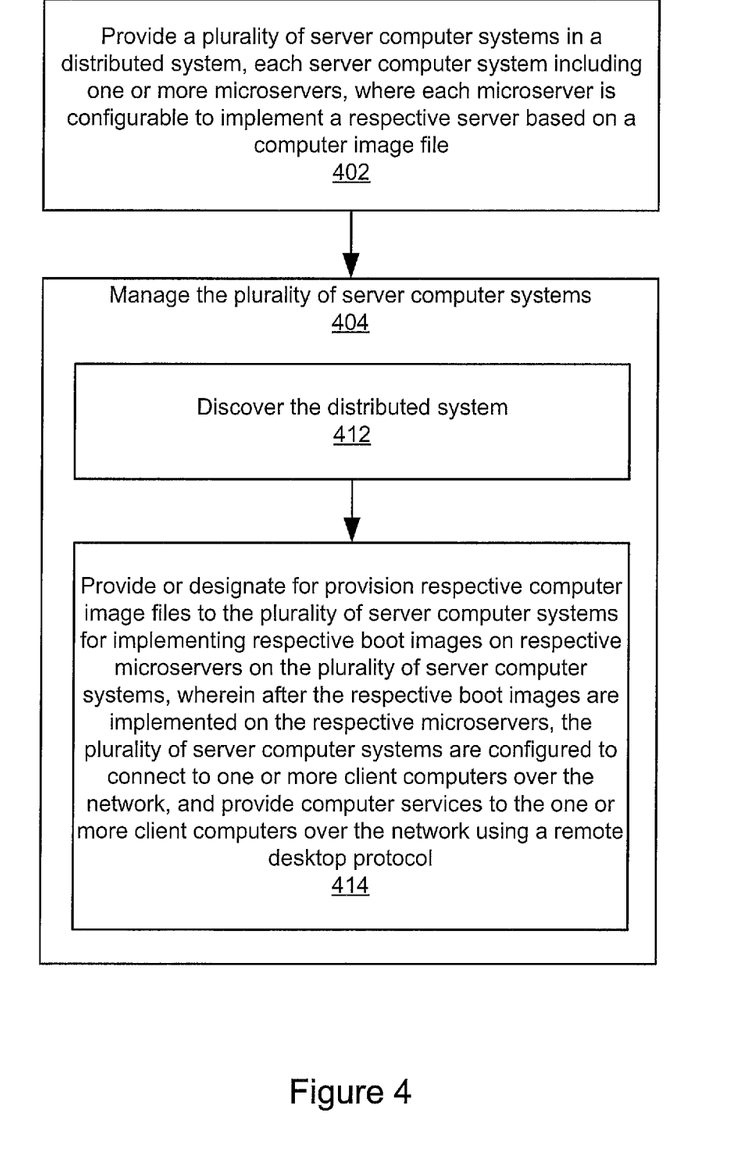
FIG. 4 flowcharts a method for providing computer services over a network, according to one embodiment.

FIG. 4—Method for Providing Computer Services Over a Network

FIG. 4 flowcharts a method for providing computer services over a network, according to one embodiment. The method shown in FIG. 4 may be used in conjunction with any of the computer systems or devices shown in the above Figures, among other devices. For example, the method may be performed or implemented by a management server. In various embodiments, some of the method elements shown may be performed concurrently, in a different order than shown, or may be omitted. Additional method elements may also be performed as desired. As shown, this method may operate as follows.

In 402, a plurality of server computer systems in a distributed system may be provided. Each server computer system may include one or more microservers, where each microserver may be configurable to implement a respective server based on a computer image file. As described above, in some embodiments, the computer image file may include a pre-execution environment (PXE) boot image. The server computer system may further include a network interface for connecting to a network, and a network switch, coupled to the one or more microservers and the network interface, where the network switch is configured to switchably connect any of the microservers to the network via the network interface.

In 404, the plurality of server computer systems may be managed, e.g., by a management server. In one embodiment, managing the plurality of server computer systems may include the following:

In 412, the distributed system may be discovered. For example, the management server may automatically determine the components of the distributed system. This discovering may include discovering one or more of: the plurality of server computer systems, the microservers comprised on the plurality of server computers, switching capabilities of the plurality of server computer systems, available storage devices of the plurality of server computer systems, and/or configuration of the available storage devices. In further embodiments, any other aspects of the distributed system may be discovered.

In 414, respective computer image files may be provided or designated for provision to the plurality of server computer systems for implementing respective boot images, e.g., PXE boot images, on respective microservers on the plurality of server computer systems. After the respective boot images are implemented on the respective microservers, the plurality of server computer systems may be configured to connect to one or more client computers over the network, and provide computer services to the one or more client computers over the network using a remote desktop protocol, e.g., for charge.

Exemplary Embodiments

The following describes various exemplary embodiments, but being exemplary only, the embodiments described are not intended to limit the systems or methods to any particular form, function, appearance, or set of features. For example, in some embodiments, one or more of the features disclosed in the above listed patents and applications incorporated by reference may be incorporated into the present approach.

As described above, the system may include a plurality of server computer systems, where each server computer system of the plurality of server computer systems includes one or more microservers, where each microserver includes at least one processor, and a memory, coupled to the at least one processor, and where each microserver is configurable to implement a respective server based on a computer image file, e.g., including a pre-execution environment (PXE) boot image. As noted above, the system may further include a network interface for connecting to a network, and a network switch, coupled to the one or more microservers and the network interface, where the network switch is configured to switchably connect any of the microservers to the network via the network interface.

In some embodiments, the system may further include a management server computer, coupled to or comprised in the plurality of server computer systems over the network, wherein the management server computer includes at least one processor, and a memory, coupled to the at least one processor. The memory may store program instructions executable by the at least one processor to manage the plurality of server computer systems, e.g., to perform or implement embodiments of the method of FIG. 4.

Elaborating on or augmenting the above, in some embodiments, the method may include providing or designating provision of respective computer image files to the plurality of server computer systems for implementing respective PXE boot images on respective microservers. Each server computer system of the plurality of server computer systems may be configured to receive at least one computer image file from the management server computer or a designated computer image file store, and implement at least one PXE boot image on at least one of the one or more microservers based on the at least one computer image file. Each server computer system of the plurality of server computer systems may be further configured to connect to one or more client computers over the network, and provide computer services to the one or more client computers over the network using a remote desktop protocol.

In some embodiments, the computer image file may include one or more of: an operating system (OS) for the PXE boot image, configuration information for the PXE boot image, user preferences for the PXE boot image, drivers for the PXE boot image, or one or more updates for the PXE boot image. In further embodiments, the computer image file may include any other data or bootable elements or images desired.

In one embodiment, the memory of each microserver may be or include a solid-state drive (SSD), e.g., flash memory, random access memory (RAM), etc.

As noted above, and shown in FIGS. 1 and 2, in some embodiments, each server computer system may be or include a blade server (i.e., a server implemented on a blade computer). Moreover, in some embodiments, the management server computer may itself be a microserver included in one of the server computer systems, where the management server computer may be connected to the other microservers via the network switch. The management server computer may further include a storage device, coupled to the at least one processor and the memory, where the management server computer may be configured to utilize the storage device for log data or management data, as desired.

Similarly, in one embodiment, two or more server computer systems of the plurality of server computer systems may each include a respective microserver that implements a respective management server computer. Each of the management server computers may be connected to the other microservers via the network switch of the server computer system, and may include a storage device, coupled to the at least one processor and the memory, where the respective management server computer is configured to utilize the storage device for log data or management data.

Alternatively, or additionally, in some embodiments, the management server computer may be separate and distinct from the plurality of server computer systems, and the management server computer may further include a network interface for connecting to the network, a network switch, coupled to the network interface, and configured to switchably connect the management server computer to any of the microservers over the network via the network interface, and a storage device, coupled to the at least one processor and the memory, where, as above, the management server computer may be configured to utilize the storage device for log data or management data.

In one embodiment, designating provision of respective computer image files may include the management server computer providing respective addresses of servers that contain the respective computer image files to one or more server computer systems of the plurality of server computer systems. Accordingly, to receive at least one computer image file from the management server or a designated computer image file store, the one or more server computer systems of the plurality of server computer systems may be configured to request and receive the respective computer image files from the servers that contain the respective computer image files based on the provided addresses.

In some embodiments, one of the microservers included in at least one of the server computer systems may be a cache microserver that includes a cache for computer image files for other microservers included in the server computer system. The cache microserver may include a storage device coupled to the at least one processor and the memory, where the cache is implemented via the storage device. The management server computer may be further configured to deliver computer image files for any of the other microservers included in the server computer system to the cache microserver, and each of the other microservers included in the server computer system may be configured to access the cache microserver to obtain respective computer image files.

In various embodiments, the cache microserver may be controllable by the management server computer to purge the cache, purge an individual computer image file from the cache, restart the cache microserver, take the cache microserver offline, and/or view logs on the cache server, among other cache related tasks.

Moreover, in some embodiments, at least one PXE boot image may implement a hypervisor and associated boot environment whereby a microserver is bootable into the hypervisor. Thus, the PXE boot image may provide both a virtual machine (VM) and a hypervisor (and associated boot environment) into which the microserver may be booted.

Additionally, in further embodiments, any of the above described features (including those disclosed in the applications and patents incorporated by reference above) may be used in any combination desired.

It should be noted that each of the above-described system embodiments may be used to perform corresponding methods, where each system element performs its respective functionality during operation of the system as a method element.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:
1. A system, comprising:
a plurality of server computer systems,
wherein each server computer system comprises a blade server,
wherein each server computer system of the plurality of server computer systems, comprises:
a plurality of microservers,
wherein each microserver comprises:
at least one processor; and
a memory, coupled to the at least one processor;
wherein each microserver is configurable to implement a respective server based on a computer image file, wherein the computer image file comprises a pre-execution environment (PXE) boot image;
a network interface for connecting to a network; and
a network switch, coupled to the one or more microservers and the network interface, wherein the network switch is configured to switchably connect any of the microservers to the network via the network interface; and
a management server computer, coupled to or comprised in the plurality of server computer systems over the network, wherein the management server computer comprises:
at least one processor; and
a memory, coupled to the at least one processor, wherein the memory stores program instructions executable by the at least one processor to:
manage the plurality of server computer systems, including:
providing or designating provision of respective computer image files to the plurality of server computer systems for implementing respective PXE boot images on respective microservers;
wherein each server computer system of the plurality of server computer systems is configured to:

receive at least one computer image file from the management server computer or a designated computer image file store;

implement at least one PXE boot image on at least one of the one or more microservers based on the at least one computer image file;

connect to one or more client computers over the network; and provide computer services to the one or more client computers over the network using a remote desktop protocol.

2. The system of claim 1, wherein the computer image file comprises one or more of:

an operating system (OS) for the PXE boot image;
configuration information for the PXE boot image;
user preferences for the PXE boot image; drivers for the PXE boot image; or
one or more updates for the PXE boot image.

3. The system of claim 1, wherein the memory of each microserver comprises a solid-state drive (SSD).

4. The system of claim 1, wherein the management server computer is a microserver comprised in one of the server computer systems, and wherein the management server computer is connected to the other microservers via the network switch, wherein the management server computer further comprises:

a storage device, coupled to the at least one processor and the memory,
wherein the management server computer is configured to utilize the storage device for log data or management data.

5. The system of claim 4, wherein two or more server computer systems of the plurality of server computer systems each comprises a respective microserver that implements a respective management server computer, wherein the management server computer is connected to the other microservers via the network switch of the server computer system, and wherein each respective management server computer further comprises:

a storage device, coupled to the at least one processor and the memory, wherein the respective management server computer is configured to utilize the storage device for log data or management data.

6. The system of claim 1, wherein the management server computer is separate and distinct from the plurality of server computer systems, wherein the management server computer further comprises:
a network interface for connecting to the network;
a network switch, coupled to the network interface,
wherein the network switch is configured to switchably connect the management server computer to any of the microservers over the network via the network interface; and
a storage device, coupled to the at least one processor and the memory, wherein the management server computer is configured to utilize the storage device for log data or management data.

7. The system of claim 1, wherein said designating provision of respective computer image files comprises: the management server computer providing respective addresses of servers that contain the respective computer image files to one or more server computer systems of the plurality of server computer systems; wherein to receive at least one computer image file from the management server or a designated computer image file store, the one or more server computer systems of the plurality of server computer systems are configured to: request and receive the respective computer image files from the servers that contain the respective computer image files based on the provided addresses.

8. The system of claim 1, wherein one of the microservers comprised in at least one of the server computer systems is a cache microserver comprising a cache for computer image files for other microservers comprised in the server computer system, wherein the cache microserver comprises a storage device coupled to the at least one processor and the memory, wherein the cache is implemented via the storage device;
wherein the management server computer is further configured to deliver computer image files for any of the other microservers comprised in the server computer system to the cache microserver;
wherein each of the other microservers comprised in the server computer system is configured to access the cache microserver to obtain respective computer image files; and
wherein the cache microserver is controllable by the management server computer to perform one or more of:
purging the cache;
purging an individual computer image file from the cache;
restarting the cache microserver;
taking the cache microserver offline; or
viewing logs on the cache server.

9. The system of claim 1, wherein at least one PXE boot image implements a hypervisor and associated boot environment whereby a microserver is bootable into the hypervisor.

10. A non-transitory computer accessible memory medium that stores program instructions executable by a processor of a management server to implement:

managing a plurality of server computer systems in a distributed system,
wherein each server computer system comprises a blade server,
wherein each server computer system, comprises:
a plurality of microservers,
wherein each microserver is configurable to implement a respective server based on a computer image file,
wherein the computer image file comprises a pre-execution environment (PXE) boot image;
a network interface for connecting to a network; and
a network switch, coupled to the one or more microservers and the network interface, wherein the network switch is configured to switchably connect any of the microservers to the network via the network interface;
wherein said managing the plurality of server computer systems comprises:
discovering the distributed system, including discovering:
the plurality of server computer systems;
the microservers comprised on the plurality of server computers;
switching capabilities of the plurality of server computer systems;
available storage devices of the plurality of server computer systems; and
configuration of the available storage devices; and
providing or designating provision of respective computer image files to the plurality of server computer systems for implementing respective PXE boot images on respective microservers on the plurality of server computer systems;

wherein, after the respective PXE boot images are implemented on the respective microservers, the plurality of server computer systems are configured to:

connect to one or more client computers over the network; and provide computer services to the one or more client computers over the network using a remote desktop protocol.

11. The non-transitory computer accessible memory medium of claim 10, wherein the computer image file comprises one or more of:

an operating system (OS) for the PXE boot image;
configuration information for the PXE boot image;
user preferences for the PXE boot image;
drivers for the PXE boot image; or
one or more updates for the PXE boot image.

12. The non-transitory computer accessible memory medium of claim 10, wherein the memory of each microserver comprises a solid-state drive (SSD).

13. The non-transitory computer accessible memory medium of claim 10, wherein the management server computer is a microserver comprised in one of the server computer systems, and wherein the management server computer is connected to the other microservers via the network switch, wherein the management server computer further comprises:

a storage device, coupled to the at least one processor and the memory, wherein the management server computer is configured to utilize the storage device for log data or management data.

14. The non-transitory computer accessible memory medium of claim 13, wherein two or more server computer systems of the plurality of server computer systems each comprises a respective microserver that implements a respective management server computer, wherein the management server computer is connected to the other microservers via the network switch of the server computer system, and wherein each respective management server computer further comprises:

a storage device, coupled to the at least one processor and the memory, wherein the respective management server computer is configured to utilize the storage device for log data or management data.

15. The non-transitory computer accessible memory medium of claim 10, wherein the management server computer is separate and distinct from the plurality of server computer systems, wherein the management server computer further comprises:

a network interface for connecting to the network;
a network switch, coupled to the network interface, wherein the network switch is configured to switchably connect the management server computer to any of the microservers over the network via the network interface; and a storage device, coupled to the at least one processor and the memory, wherein the management server computer is configured to utilize the storage device for log data or management data.

16. The non-transitory computer accessible memory medium of claim 10, wherein said designating provision of respective computer image files comprises:

the management server computer providing respective addresses of servers that contain the respective computer image files to one or more server computer systems of the plurality of server computer systems;

wherein to receive at least one computer image file from the management server or a designated computer image file store, the one or more server computer systems of the plurality of server computer systems are configured to:

request and receive the respective computer image files from the servers that contain the respective computer image files based on the provided addresses.

17. The non-transitory computer accessible memory medium of claim 10, wherein one of the microservers comprised in at least one of the server computer systems is a cache microserver comprising a cache for computer image files for other microservers comprised in the server computer system, wherein the cache microserver comprises a storage device coupled to the at least one processor and the memory, wherein the cache is implemented via the storage device;

wherein the management server computer is further configured to deliver computer image files for any of the other microservers comprised in the server computer system to the cache microserver;

wherein each of the other microservers comprised in the server computer system is configured to access the cache microserver to obtain respective computer image files; and wherein the cache microserver is controllable by the management server computer to perform one or more of:

purging the cache;
purging an individual computer image file from the cache;
restarting the cache microserver; taking the cache microserver offline; or
viewing logs on the cache server.

18. The non-transitory computer accessible memory medium of claim 11, wherein at least one PXE boot image implements a hypervisor and associated boot environment whereby a microserver is bootable into the hypervisor.

19. A server computer, wherein each server computer system comprises a blade server, comprising:

a plurality of microservers,
wherein each microserver comprises:
at least one processor; and
a memory, coupled to the at least one processor;
wherein each microserver is configurable to implement a respective server based on a computer image file,
wherein the computer image file comprises a pre-execution environment (PXE) boot image;
a network interface for connecting to a network; and
a network switch, coupled to the one or more microservers and the network interface, wherein the network switch is configured to switchably connect any of the microservers to the network via the network interface;

wherein the server computer is configured to:

receive at least one computer image file from a management server computer or a designated computer image file store;

implement at least one PXE boot image on at least one of the one or more microservers based on the at least one computer image file;

connect to one or more client computers over the network; and provide computer services to the one or more client computers over the network using a remote desktop protocol.

* * * * *

UNITED STATES PATENT AND TRADEMARK OFFICE
CERTIFICATE OF CORRECTION

PATENT NO.         : 9,537,949 B2
APPLICATION NO.    : 14/035088
DATED              : January 3, 2017
INVENTOR(S)        : Syed Mohammad Amir Husain et al.

It is certified that error appears in the above-identified patent and that said Letters Patent is hereby corrected as shown below:

In the Claims

Column 20, Line 42 (Claim 18), please delete "claim 11," and substitute -- claim 10, --.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*